(12) United States Patent
Ryskamp et al.

(10) Patent No.: US 12,328,646 B2
(45) Date of Patent: Jun. 10, 2025

(54) INTEGRATED PUSH-TO-TALK COMMUNICATION

(71) Applicant: Zoom Video Communications, Inc., San Jose, CA (US)

(72) Inventors: Robert Allen Ryskamp, Mountainview, CA (US); Adam Justin Spooner, Greensboro, NC (US)

(73) Assignee: Zoom Communications, Inc., San Jose, CA (US)

( * ) Notice: Subject to any disclaimer, the term of this patent is extended or adjusted under 35 U.S.C. 154(b) by 360 days.

(21) Appl. No.: 17/874,835

(22) Filed: Jul. 27, 2022

(65) Prior Publication Data

US 2024/0040340 A1   Feb. 1, 2024

(51) Int. Cl.
*H04W 4/10*   (2009.01)
*H04W 4/08*   (2009.01)

(52) U.S. Cl.
CPC .............. *H04W 4/10* (2013.01); *H04W 4/08* (2013.01)

(58) Field of Classification Search
CPC ............ H04L 65/40; H04W 4/08; H04W 4/10
See application file for complete search history.

(56) References Cited

U.S. PATENT DOCUMENTS

| | | | |
|---|---|---|---|
| 7,809,389 B2 | 10/2010 | Jang et al. | |
| 7,826,603 B1 | 11/2010 | Denman et al. | |
| 8,150,375 B2 | 4/2012 | Munie | |
| 8,594,586 B1 | 11/2013 | Myers | |
| 10,085,124 B2 | 9/2018 | Patel et al. | |
| 10,212,622 B2 | 2/2019 | Eller et al. | |
| 10,582,009 B2 | 3/2020 | Brown et al. | |
| 10,582,345 B1 * | 3/2020 | Lim | H04W 4/08 |
| 10,959,062 B1 * | 3/2021 | Walker | H04W 4/10 |
| 11,082,810 B2 | 8/2021 | Park | |
| 2004/0249949 A1 * | 12/2004 | Gourraud | H04W 4/10 709/227 |
| 2013/0109426 A1 * | 5/2013 | Kerger | H04W 4/08 455/518 |
| 2015/0271650 A1 * | 9/2015 | Osanai | H04W 4/08 455/518 |
| 2018/0284960 A1 * | 10/2018 | Borisova | G06F 3/0485 |
| 2019/0347332 A1 * | 11/2019 | Hiraoka | H04W 4/08 |

(Continued)

OTHER PUBLICATIONS

Nortel "Nortel IP Phone WLAN Handset User Guide (CICM)"; NN10042-116 04.01 Standard, Jul. 4, 2008, 134 pages.

(Continued)

*Primary Examiner* — Nguyen T Vo (74) *Attorney, Agent, or Firm* — Kilpatrick Townsend & Stockton LLP (57) ABSTRACT

Example methods and systems provide push-to-talk (PTT) functionality integrated with other functions. The PTT functionality can include a graphical interface provided by a client application. The graphical interface can display PTT groups and/or icons for individual users. Users can generate PTT group definitions in response to input to the client application. A group control input can cause PTT transmission from a client device to a group of client devices corresponding to the PTT group. PTT groups can optionally be shared through the client application or via a URL that invokes a private Web page, and recording and transcription of PTT communication can optionally be provided.

17 Claims, 7 Drawing Sheets

(56) References Cited

U.S. PATENT DOCUMENTS

2019/0373419 A1   12/2019  Bayley et al.
2020/0359198 A1   11/2020  Au et al.
2023/0109198 A1*  4/2023  Tassone .............. H04L 65/1104
                                                                370/261

OTHER PUBLICATIONS

Lin et al., "iPTT: Peer-to-Peer Push-to-Talk for VoIP" Lin—2008; Wireless Communications and Mobile Computing—Wiley Online Library, 2 pages.

* cited by examiner

INTEGRATED PUSH-TO-TALK COMMUNICATION

FIELD

The present application generally relates to push-to-talk (PTT) communications and more particularly relates to systems and methods for providing PTT communication in a digital telecommunication system.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of systems and methods for providing integrated push-to-talk (PTT) communication. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Digital telephone systems as well as videoconferencing systems enable their users to create and attend conferences (or "meetings") via various types of client devices. After joining a meeting, the participants receive audio and/or video streams or feeds (or "multimedia" streams or feeds) from the other participants and, in the case of a videoconference, are presented with views of the video feeds from one or more of the other participants and audio from the audio feeds. Using these different modalities, the participants can see and/or hear each other, engage more deeply, and generally have a richer experience despite not being physically in the same space.

In the case of videoconferencing systems, to create a meeting, a person (referred to as the "host" or "meeting host") accesses the videoconferencing system, schedules a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial, or main host can, in some systems, make another participant a co-host. For purposes of the discussion herein, the term "host" encompasses hosts and co-hosts. Hosts can manage and control the videoconferencing session.

Digital phone systems provide functions similar to those of traditional telephone systems, but many modern digital phone systems can also provide graphical user interfaces to set up calls, listen to messages, perform call transfers, and set up or schedule teleconferences. Recently, integrated digital telecommunication systems that include a digital phone system as well as a videoconferencing system have become available. Such systems can include client applications as well as server or cloud infrastructures for the client applications to connect to. Such integrated systems can provide both digital phone and videoconferencing functions in an integrated fashion. For example, such integrated systems may provide users with the capability to "convert" a digital phone call into a videoconference, or vice versa. The presence of a user to the system can also be reflected in indicators that are displayed to other users whether they are using digital telephone functions or videoconferencing functions. In addition to video and/or audio communication capability, some videoconferencing and integrated systems also provide a text-based chat function.

To provide more versatility and convenience for users of modern digital telecommunication platforms and applications, a telecommunication system according to this disclosure includes PTT functionality integrated with other functions. The PTT functionality can include a graphical interface provided by a client application. The graphical interface can display PTT groups and/or icons for individual users. Further, the client application can provide the capability to users of client computing devices to directly define, edit, and manage PTT groups without relying on a system administrator.

A PTT group is a defined group of users that can be configured, deleted, and edited by a user through the client application running on a user device. Once a group has been established, a user can press a virtual button and instantly send a real-time voice message to a group of people without entering numbers or addresses. A recipient can respond in a similar fashion, and the graphical user interface can provide information to a user about the status of PTT communications, for example, with which group or individual an incoming audio message is associated. PTT messages can also be sent to an individual user.

In the case of an integrated platform that includes a digital telephone function, a videoconferencing function, or both, the PTT function can be integrated with the platform such that appropriate icons to execute the PTT function appear associated with information about other users. This information can be presented in the interface. Indicators can also be provided so that a user understands where PTT messages being received are originating. In some examples, recording and transcribing functions that might otherwise be used with audio and video conferences can be configured to also work with PTT messages. In some examples, a Web browser can be used to provide PTT client functions for a user of the system.

A system according to some examples can establish a communication session including multiple client devices and access to one or more PTT group definitions previously specified using an integrated PTT client application. One or more PTT groups corresponding to PTT group definitions can be displayed in the PTT client application on at least one client device. The application can receive a group control input at the client device, and provide a PTT transmission from the client device to group client devices corresponding to the PTT group. The application can handle PTT transmissions to individuals who are not part of a group in a similar fashion.

The techniques disclosed herein for providing integrated PTT communication enable users of digital telecommunication platforms to send and receive instant audio messages without entering telephone numbers or any other identifying information to send each message. The PTT controls can be provided in a graphical user interface for a digital phone or videoconferencing application on any device.

This illustrative example is given to introduce the reader to the general subject matter discussed herein and the disclosure is not limited to this example. The following sections describe various additional non-limiting examples and examples of systems and methods for providing integrated PTT communication.

Figure 1:
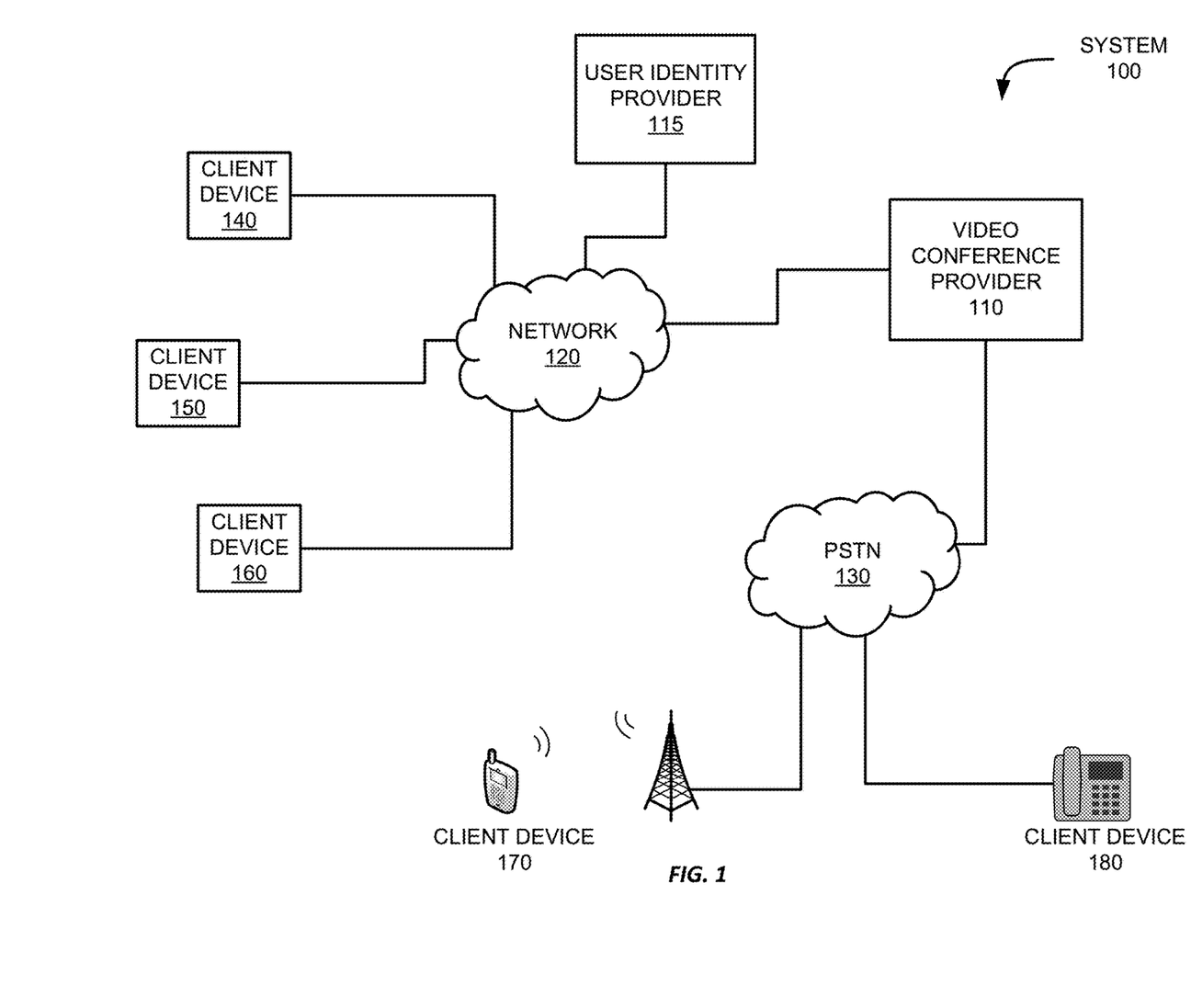
FIGS. 1 through 3 illustrate example systems to enable integrated push-to-talk communication.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
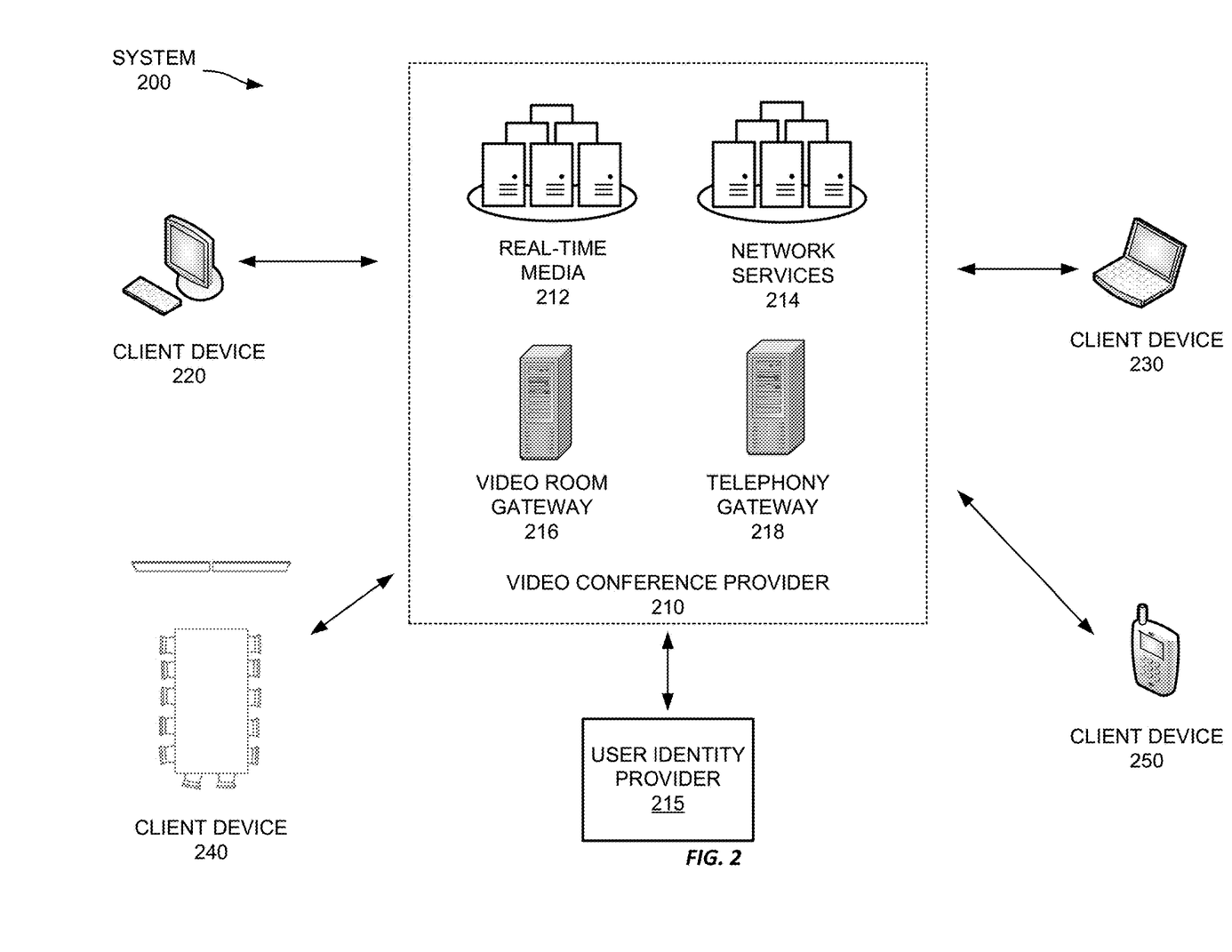

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the system of video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
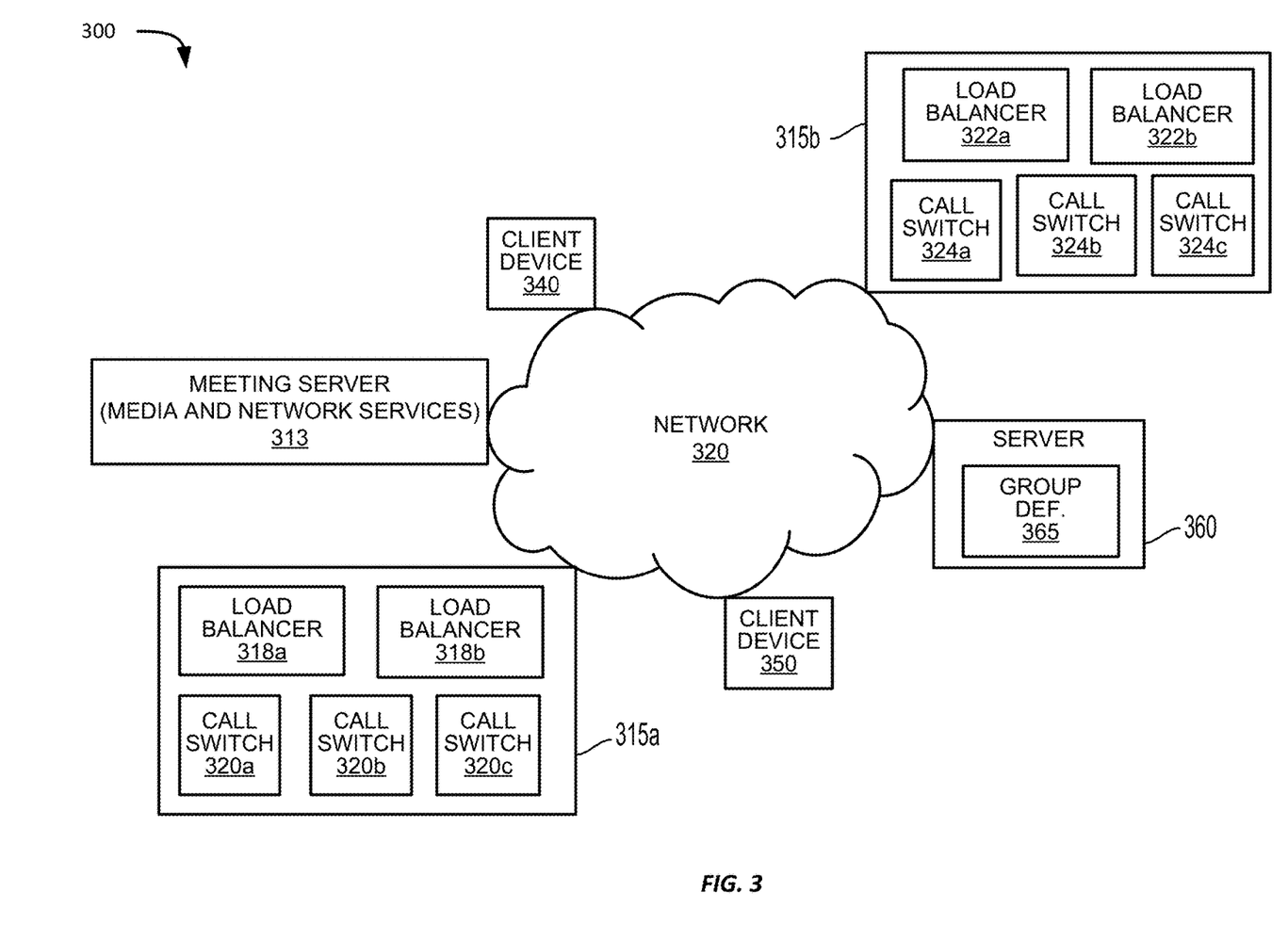

Referring now to FIG. 3, FIG. 3 shows an example integrated communication system 300 in which videoconferencing functionality as well as digital phone functionality is provided to various client devices, such as client device 340 and client device 350, each communicatively coupled to network 320. System 300 includes PTT capability as described herein. Example system 300 includes meeting server 313. Meeting server 313 may also be referred to as a multimedia router and can be implemented by the real-time media servers 212 working with the network services servers 214. The meeting server maintains stored representations of virtual meetings taking place in the system so that the meeting server can keep track of the status of meetings without constantly exchanging this information with client devices such as client device 340 and client device 350. System 300 provides includes server 360 that provides PTT services as described herein. Server 360 stores group definitions 365, which define groups of users, the identifiers for which can be presented to users through graphical interfaces of client applications running on client devices 340 and 350. PTT groups can also be provided in a Web browser along with other visual interface features to enable users of computing devices without the client application installed to make use of the system.

Example system 300 includes session border controllers (SBCs) 315a-b. System 300 includes two SBCs as an example. Any number of SBCs can be used; multiple SBCs provide redundancy. The SBCs provide call CODECs, audio processing, error correction, links to telephone carriers, and encryption for digital telephone calls between client applications in the integrated communication system 300.

The SBCs secure client and carrier communications passing through a data center. SBC 315a includes load balancers 318a-b and call switches 320a-c. SBC 315b includes load balancers 322a-b and call switches 324a-c. As an example, signaling for call setup, management, and teardown in system 300 can be accomplished using session initiation protocol (SIP). SIP communication through the call switches is evenly distributed by the load balancers based on call volume. The call switches provide call control for digital telephone communications and can provide PBX functionality. The call switches also provide integrated functions to enable calls to be transitioned to videoconferences using meeting server 313 and/or vice versa. Call switches 320a-c and 324a-c in this example are also responsible for PTT communication using SIP to manage the transmissions. As will be appreciated from the discussion below with reference to FIG. 5, pressing a PTT button can the form of tapping or clicking a screen icon.

Figure 4:
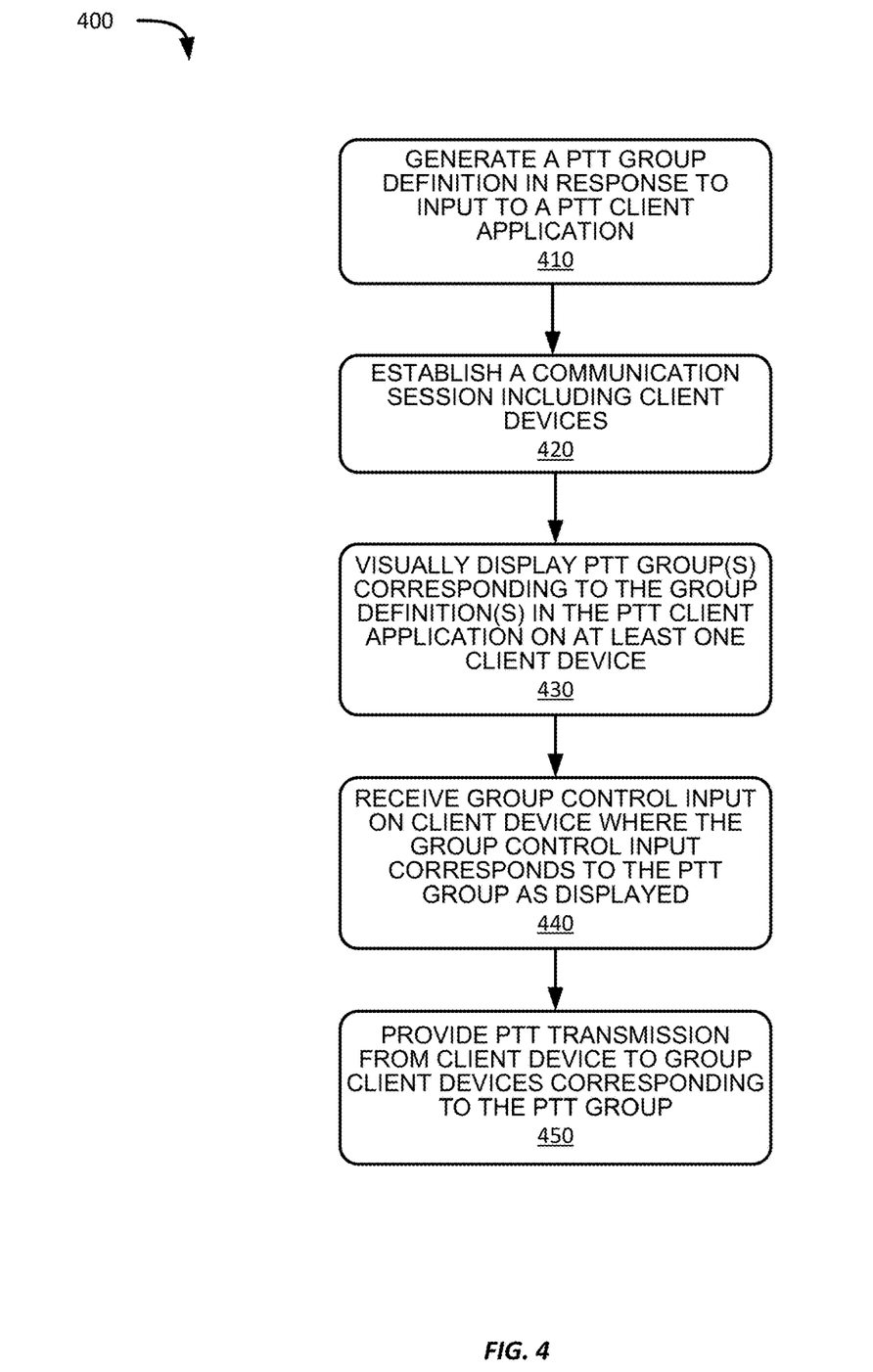
FIG. 4 illustrates an example method for providing integrated push-to-talk communication.

Referring now to the method 400 illustrated in FIG. 4, FIG. 4 shows an example method 400 for providing integrated push-to-talk communication. The description of the method 400 in FIG. 4 will be made with reference to the system of FIG. 3. However, any suitable system according to this disclosure may be used, such as the example systems 100 and 200 shown in FIGS. 1 and 2.

At block 410, a processor or processors, for example, a processor such as processor 710 (discussed below with respect to FIG. 7) running in the SBCs and/or in the client devices executing the client applications, generates a push-to-talk (PTT) group definition in response to input to a PTT client application. Thus, an end user can set up, edit, and change the members of a PTT group. These defined PTT groups can be configured using a client device and the group definitions can be stored in the client devices, or in a server such as with group definitions 365 stored in server 360. At block 420, a communication session is established among client devices. This communication session may be, as examples, a videoconference, a teleconference, or connectivity and presence awareness to provide for real-time PTT messages by themselves. At block 430, one or more PTT groups are visually displayed in the PTT client application on at least one client device, for example client device 340 or client device 350. At block 440, a client device receives a group control input which corresponds to a PTT group as displayed. At block 450, the PTT transmission is provided from a client device to group client devices corresponding to the defined PTT group.

The group control input can include pressing the appropriate icon with a finger or stylus or clicking with a mouse, or by pressing a predefined key on keyboard, such as the spacebar. The press may be instantaneous or a press that continues while speaking, to provide the saliency of a legacy two-way radio system. If the interface provides for an instantaneous press, the client application can detect an end to the corresponding PTT message based a timed interval of silence and a message to end the transmission can be sent, emulating a voice-operated relay.

SIP invite messages can be used to initiate the PTT transmission described with respect to block 450, and SIP bye messages can be used to terminate a PTT transmission, both in real time. Contention can occur between multiple PTT transmissions, as when two users press the appropriate PTT button for a group or individual at about the same time another group member or the individual does the same. Contention, as an example, can be handled using UDP-based protocols such as real-time transport control protocol (RTCP), secure transport control protocol (STCP), or others. A more detailed discussion of an interface and method for providing integrated PTT communication with various optional features is provided below with respect to FIG. 5 and FIG. 6.

Figure 5:
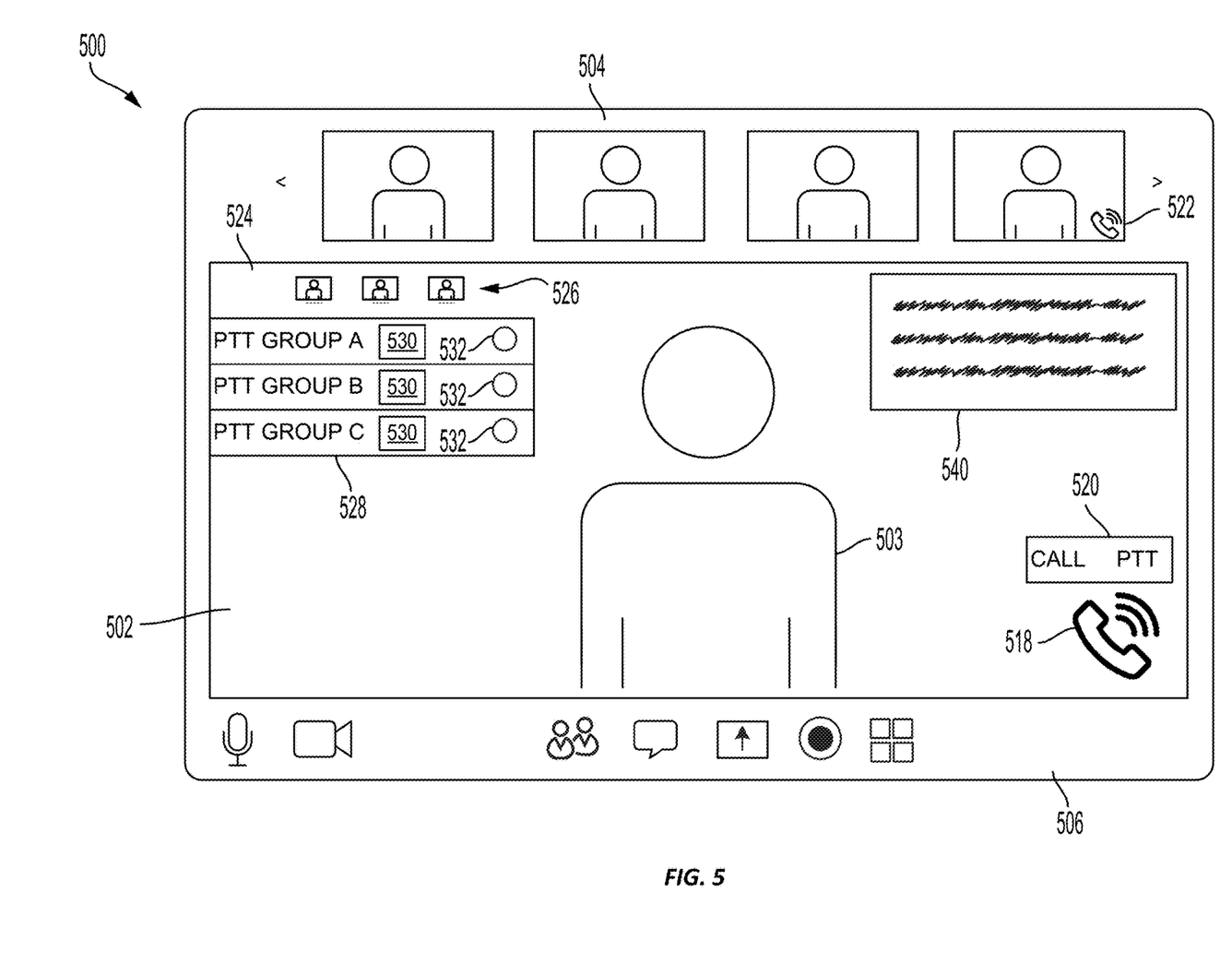
FIG. 5 illustrate an example screenshot of a user interface that provides integrated push-to-talk communication.

Referring now to FIG. 5, FIG. 5 illustrates an example graphical user interface (GUI) 500 that is providing integrated PTT capability in addition to digital telephone and videoconferencing functions during an on-going video conference. User interface 500 includes a main viewing area 502. Main viewing area 502 may display various images, depending on the configuration of the GUI chosen by the videoconference participant. In this example, main viewing area 502 is displaying an image 503 of the current or active speaker in a videoconference. User interface 500 also includes a gallery strip 504. Gallery strip 504 displays thumbnail images of the most recent speakers in the videoconference. User interface 500 also includes a toolbar 506. Toolbar 506 includes various user controls, as examples, controls for video devices, microphones, chat functions, gesture functions, and recording functions.

GUI 500 includes a telephone icon 518 that can be used to initiate a digital telephone call to the client device of the participant in image 503. Additionally, in this example, a context menu 520 can be accessed that provides the user of the client device displaying GUI 500 with a choice of initiating a call and waiting for the recipient to pick up, or pressing "PTT" and speaking to provide a PTT message to the recipient. Telephone icon 522 provide a similar function for a participant who is visible in gallery strip 504.

Staying with FIG. 5, GUI 500 includes PTT area 524, which presents icons and other screen features to provide for PTT messaging, including sending and receiving messages to client devices of users who are not currently engaged in the videoconference or in a digital telephone call. Icons 526 are visually displayed for individual users. In some examples, these icons include a photo or an avatar of the user. A user icon corresponds to a user device from among the client devices in the communication session. The client device displaying GUI 500 is configured to provide a PTT transmission to the user device corresponding to an icon in response to interaction with the user icon. For example, these icons can be "pressed" either by a mouse click, or if on a touch screen, by pressing a finger or stylus down on the icon to send a PTT message to the client device of the user represented. Additionally, these icons can change to indicate a received PTT message is originating from the represented user. The change may include, for example, going from "greyed out" to "lit up," changing color, or changing shape.

If the interface provides for an instantaneous press for PTT messaging, various configuration options may be provided for the user of the client application. The choice between holding the virtual button (icon) down to transmit and pressing instantaneously can be provided. As previously mentioned, an end to a corresponding PTT message can be based a timed interval of silence. This time interval can be configurable. The same time interval can result in the cancelation of the message if the user does not speak within the time allotted, such that full voice-operated relay (VOX) operation can be emulated.

GUI 500 in this example displays defined PTT groups 528, which may be given names when created. In this case, PTT group A, PTT group B, and PTT group C are shown. In this example, each group includes its own PTT button 530 and an indicator 532. The PTT button is used to send a PTT message and the indicator changes color or fills in to indicate that a received PTT message is originating from a member of the group. The icon arrangement shown in PTT area 524 of GUI 500 or any functionally equivalent arrangement of screen features can be presented in its own PTT interface screen or panel that is provided as part of a client application such as an integrated communication application for a mobile device, tablet, desktop, or notebook computer. It can also be provided as part of a private Web page being used to access the system by a user on a device without a dedicated client application installed.

GUI 500 in this example displays real-time transcript 540 in a window on the opposite side of the screen from the PTT groups 528. A real-time transcript of the audio of PTT transmissions can be produced either from the transmissions as processed, or from a recording with a delay. It may include timestamps and/or identification of each speaker, appearing in a fashion similar to that of a text chat window. In may be a persistent window. The window may also be a banner or similar type of window that pops up only for a time when a transmission occurs. The real-time transcript is discussed below in further detail with respect to FIG. 6.

Figure 6:
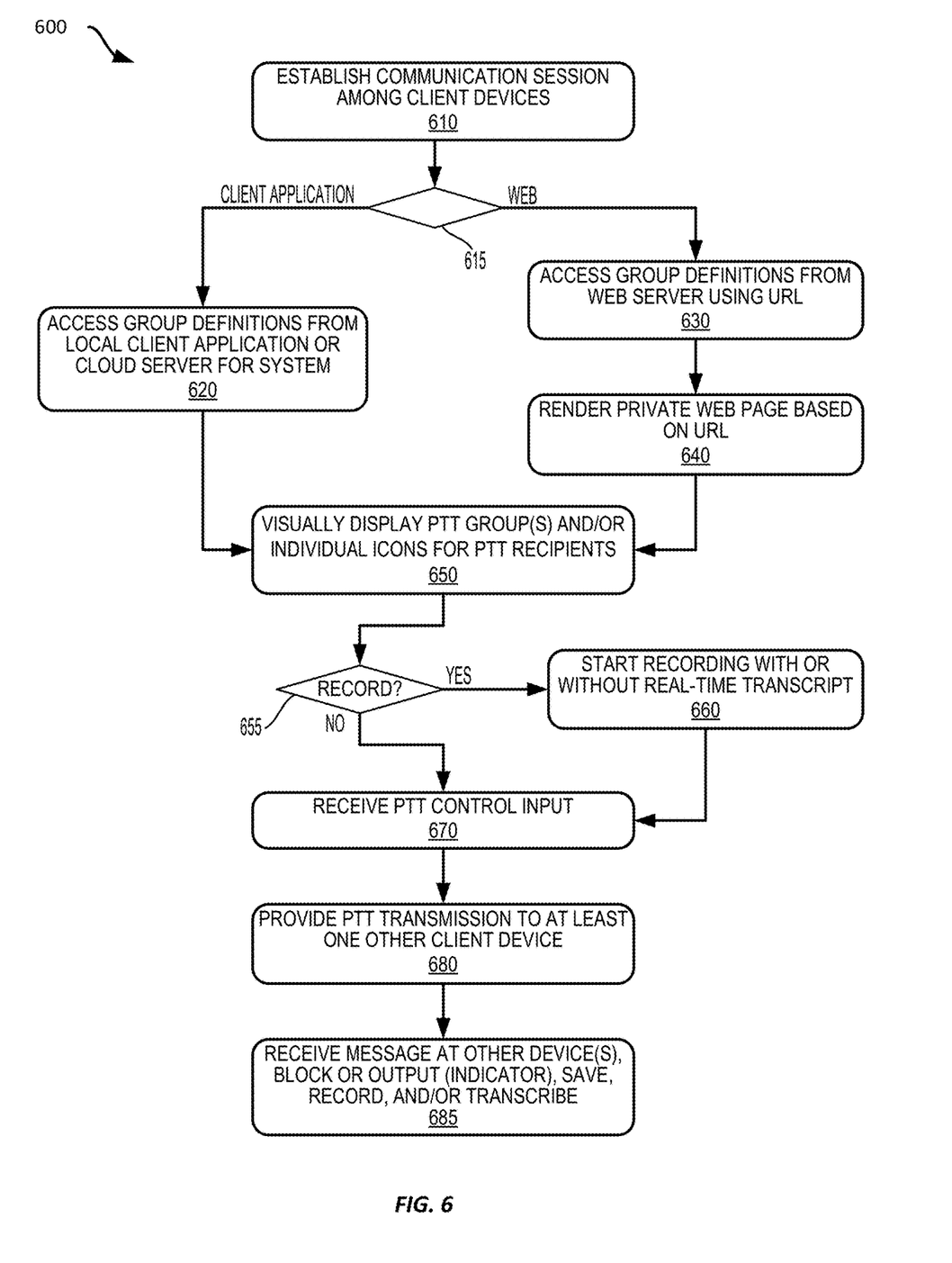
FIG. 6 illustrates another example method for providing integrated push-to-talk communication.

Referring now to the method 600 illustrated in FIG. 6, FIG. 6 shows an example method 600 for providing integrated PTT capability. The description of the method 600 in FIG. 6 will be made with reference to the graphic user interface shown in FIG. 5, and also with respect to the system of FIG. 3. However, a graphical user interface of any suitable design may be used. Also, any suitable system according to this disclosure may be used, such as the example systems 100 and 200 shown in FIGS. 1 and 2. It can be assumed for purposes of FIG. 6 that one or more users have already caused one or more PTT group definitions to be stored for access within a communication session. As an example, a user of an application like that displaying user interface 500 can drag individual icons 526 into one of the displayed groups 528, or invoke a context menu connected to one of the groups that includes similar icons that can be dragged away. Such a context menu can also provide for the deletion of a PTT group.

At block 610, a processor establishes a communication session among client devices as described previously with respect to FIG. 4. Method 600 branches at block 615 depending on whether the user is accessing the system using a client application or a Web browser. If a client application is being used, the application accesses group definitions stored either locally or in a server for the system at block 620. If the user is accessing the system through a Web browser, the group definitions are retrieved from a Web server at block 630. The Web server function may be virtually or actually provided by server 360. The Web browser is typically pointed to the Web server by a uniform resource locator (URL). For example, one user may send the URL to another user using the chat function of the client application or in an email. The URL is configured to point to the Web server and the user who receives the URL in this manner can select the URL link. The Web browser parses the URL and as a result is directed to one or more PTT group definitions on the Web server. At block 640, a private Web page corresponding to the URL is rendered to graphically display PTT icons and/or groups based on the URL. The processor of the computing device displaying the private Web page in a Web browser can provide the user with the ability to interact with virtual buttons or menu items using browser scripts or plugins. The browser can be used to transmit and receive PTT messages in a manner similar to that of the client application described herein.

At block 650, PTT groups are visually displayed. These groups correspond to the group definitions accessed at block 620 or block 630. Individual icons may also be displayed. The PTT groups and other icons can be displayed in the PTT client application, which may be a videoconferencing application that includes PTT and digital telephone capability. Such an application may include a videoconferencing client interface such as GUI 500. Icons may be displayed based on a detected presence of additional users of the system or based on a stored contact list for the user or the system, as examples. In some examples, presence can be controlled by the user of the relevant client device. For example, the user can set a presence to "away," "meeting," or the like. Presence can also be set automatically based on a meeting schedule that is accessible to the system, based on elapsed time, or based on the user's status with respect to interaction with the integrated client application.

A participant in a live videoconference may not wish to be disturbed by PTT messages. The client application or the system can be set manually or automatically to disable playing PTT messages and this setting can be reflected in any presence indication. In this example, PTT message sounds can be disabled for an entire teleconference or when a user is speaking or not muted.

When groups are created or edited, the groups can be given meaningful names. For example, a group for department managers can be named "Dept Managers," or similar. The various groups and icons displayed can provide for easy and efficient management of PTT communications, since visual indications provide information that corresponds to PTT functions. For example, indicators 532 can signal PTT communication being received from a user in a group, as can changes to the individual icons 526 for a user that is not a member of a group. The PTT buttons (icons 526 or group buttons 530) can change or "light up" for a time to indicate a PTT message was recently sent, allowing a user viewing the interface on her client device to be reminded of PTT conversations that are active.

A system may provide for recording PTT transmissions by activating a recording control input on a client device. If user input is detected at block 655 to activate a menu or icon to cause PTT messages to be recorded, the recording is started at block 660. Thus, users may replay recordings of PTT messages where the audio of the PTT message was not heard at the time the message was received or is not remembered. Optionally, a real-time transcript of the audio as recorded can be created and displayed along with the recording, as in the real-time transcript 540 shown as part of GUI 500. For example, the user can set a menu option or activate an icon to selectively produce (produce or not produce) the real-time transcript 540. The real-time transcript can be generated from human speech using speech-to-text (STT) conversion and updated at regular intervals. As one example, STT conversion can be accomplished using a commercial or non-commercial STT library to identify audio speech and convert it to text. An STT library includes the audio characteristics of all phonemes that make up all words in a language of interest as well as links or tables that indicate which words are made from specific patterns of phonemes.

Portions of the transcript can optionally be deleted after a time. In such a scenario, the real-time transcript may be no more than a temporary reference. If the real-time transcript is being made from a recording, a feature can be provided by which the user can select a portion of the transcript on the screen and replay the corresponding section of audio.

Still referring to FIG. 6, at block 670 of method 600, the client device receives a control input to send a PTT message, such as by interacting with context menu 520 of GUI 500, an icon 526 of GUI 500, or a button 530 in GUI 500. At block 680, the PTT transmission is provided from the client device displaying GUI 500 to one or more recipient client devices. At block 685, the PTT message is received at one or more of the other client devices. A receiving client device can output the message for the user for that device, with or without triggering an indicator such as indicator 532. The output may also be blocked due to the state of presence of the user or due to a configuration setting. The receiving client device can also or alternatively save or record the transmission or transcribe the transmission as previously discussed.

Figure 7:
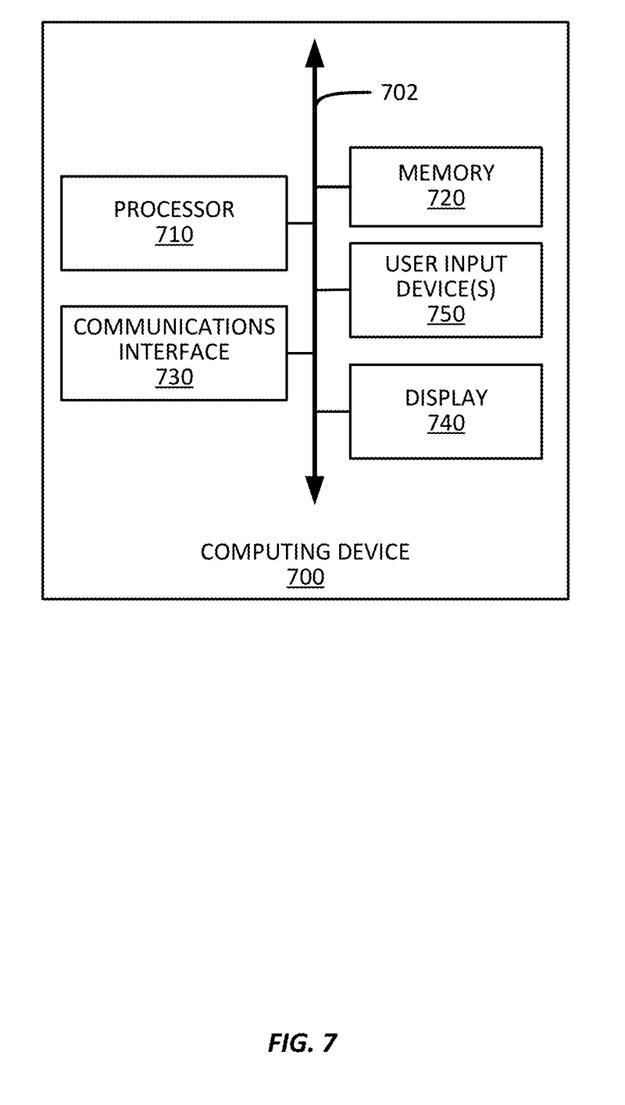
FIG. 7 shows an example computing device suitable for use with any disclosed systems, user interfaces, or methods according to this disclosure.

Referring now to FIG. 7, FIG. 7 shows an example computing device 700 suitable for use in example systems or methods for providing integrated PTT communications. The example computing device 700 includes a processor 710 which is in communication with the memory 720 and other components of the computing device 700 using one or more communications buses 702. The processor 710 is configured to execute processor-executable instructions stored in the memory 720 to perform one or more methods for providing integrated PTT communications. The computing device, in this example, also includes one or more user input devices 750, such as a keyboard, mouse, touchscreen, video input device (e.g., one or more cameras), microphone, etc., to accept user input, for example user input directed to sending a PTT message. The computing device 700 also includes a display 740 to provide visual output to a user, as examples, the screen display of FIG. 4.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A system comprising:
a processor; and
at least one memory device including instructions that are executable by the processor to cause the processor to:
generate a push-to-talk (PTT) group definition in response to input to a videoconferencing application including PTT capability;
access a videoconference including a plurality of client devices;
visually display a PTT group corresponding to the PTT group definition in a videoconferencing client interface of the videoconferencing application on at least one client device of the plurality of client devices;
receive a group control input on the at least one client device, the group control input corresponding to the PTT group as displayed; and
provide, in response to the group control input, a PTT transmission from the at least one client device to one or more group client devices corresponding to the PTT group, wherein the one or more group client devices include at least one client device that is not currently engaged in the videoconference.

2. The system of claim 1, wherein the instructions are executable by the processor to visually display a user icon, wherein the user icon corresponds to a user device from among the plurality of client devices, wherein the at least one client device is configured to provide a PTT transmission from the at least one client device to the user device in response to interaction with the user icon.

3. The system of claim 1, wherein the instructions are executable by the processor to visually display the PTT group by parsing a uniform resource locator (URL) configured to point to the PTT group definition on a server.

4. The system of claim 1, wherein the instructions are executable by the processor to visually display the PTT group on a private Web page.

5. The system of claim 1, wherein the instructions are executable by the processor to record audio from the PTT transmission based on activation of a recording control input at the at least one client device.

6. The system of claim 1, wherein the instructions are executable by the processor to display a real-time transcript of audio recorded from the PTT transmission.

7. A method comprising:
generating a push-to-talk (PTT) group definition in response to input to a videoconferencing application including PTT capability;
accessing a videoconference including a plurality of client devices;
visually display a PTT group corresponding to the PTT group definition in a videoconferencing client interface of the videoconferencing application on at least one client device of the plurality of client devices;
receiving a group control input on the at least one client device, the group control input corresponding to the PTT group as displayed; and
providing, in response to the group control input, a PTT transmission from the at least one client device to one or more group client devices corresponding to the PTT group, wherein the one or more group client devices include at least one client device that is not currently engaged in the videoconference.

8. The method of claim 7, further comprising visually displaying a user icon, corresponding to a user device from among the plurality of client devices, wherein the at least one client device is configured to provide a PTT transmission from the at least one client device to the user device in response to interaction with the user icon.

9. The method of claim 7, further comprising visually displaying the PTT group by parsing a uniform resource locator (URL) configured to point to the PTT group definition on a server.

10. The method of claim 7, further comprising visually displaying the PTT group on a private Web page in response to parsing a uniform resource locator (URL) configured to point to a Web server.

11. The method of claim 7, further comprising:
recording audio from the PTT transmission based on activation of a recording control input at the at least one client device; and
selectively producing a real-time transcript of the audio as recorded.

12. The method of claim 7, further comprising displaying a menu configured to initiate a digital telephone call or a PTT transmission to a user device from among the plurality of client devices.

13. A non-transitory computer-readable medium comprising code that is executable by a processor for causing the processor to:
generate a push-to-talk (PTT) group definition in response to input to a videoconferencing application including PTT capability;
access a videoconference including a plurality of client devices;
visually display a PTT group corresponding to the PTT group definition in a videoconferencing client interface of the videoconferencing application on at least one client device of the plurality of client devices;
receive a group control input on the at least one client device, the group control input corresponding to the PTT group as displayed; and
provide, in response to the group control input, a PTT transmission from the at least one client device to one or more group client devices corresponding to the PTT group, wherein the one or more group client devices include at least one client device that is not currently engaged in the videoconference.

14. The non-transitory computer-readable medium of claim 13, wherein the code is executable for causing the processor to visually display a user icon, wherein the user icon corresponds to a user device from among the plurality of client devices, wherein the at least one client device is configured to provide a PTT transmission from the at least one client device to the user device in response to interaction with the user icon.

15. The non-transitory computer-readable medium of claim 13, wherein the code is executable for causing the processor to:
parse a uniform resource locator (URL) configured to point to the PTT group definition on a server; and
visually display the PTT group on a private Web page corresponding to the URL.

16. The non-transitory computer-readable medium of claim 13, wherein the code is executable for causing the processor to:
record audio from the PTT transmission based on activation of a recording control input at the at least one client device; and
display a real-time transcript of the audio as recorded.

17. The non-transitory computer-readable medium of claim 15, wherein the group control input corresponds to the PTT group as displayed in a graphical user interface of the videoconferencing application.

\* \* \* \* \*